United States Patent [19]
Jacques

[11] 3,995,294
[45] Nov. 30, 1976

[54] CAMERA VIEWING ADAPTER

[76] Inventor: Arthur Edgar Jacques, 245 E. Main St., Marlboro, Mass. 01752

[22] Filed: Apr. 4, 1975

[21] Appl. No.: 565,044

[52] U.S. Cl. .............................. 354/224; 354/201; 354/223; 354/225
[51] Int. Cl.² ........................................ G03B 13/08
[58] Field of Search ............ 354/224, 223, 225, 201

[56] References Cited
UNITED STATES PATENTS

| | | | |
|---|---|---|---|
| 2,845,836 | 8/1958 | Lessler et al. | 354/223 |
| 3,590,683 | 7/1971 | Hiruma | 354/223 |
| 3,860,940 | 1/1975 | Baker | 354/225 |

FOREIGN PATENTS OR APPLICATIONS

| | | | |
|---|---|---|---|
| 627,218 | 9/1961 | Canada | 354/224 |
| 678,276 | 7/1939 | Germany | 354/224 |
| 447,742 | 11/1934 | United Kingdom | 354/224 |
| 696,484 | 9/1953 | United Kingdom | 354/201 |

Primary Examiner—Stephen J. Tomsky
Attorney, Agent, or Firm—George E. Kersey

[57] ABSTRACT

An adapter for a reflex camera formed by an adjustable image reflector that is positionable on the camera with respect to its view finder.

10 Claims, 7 Drawing Figures

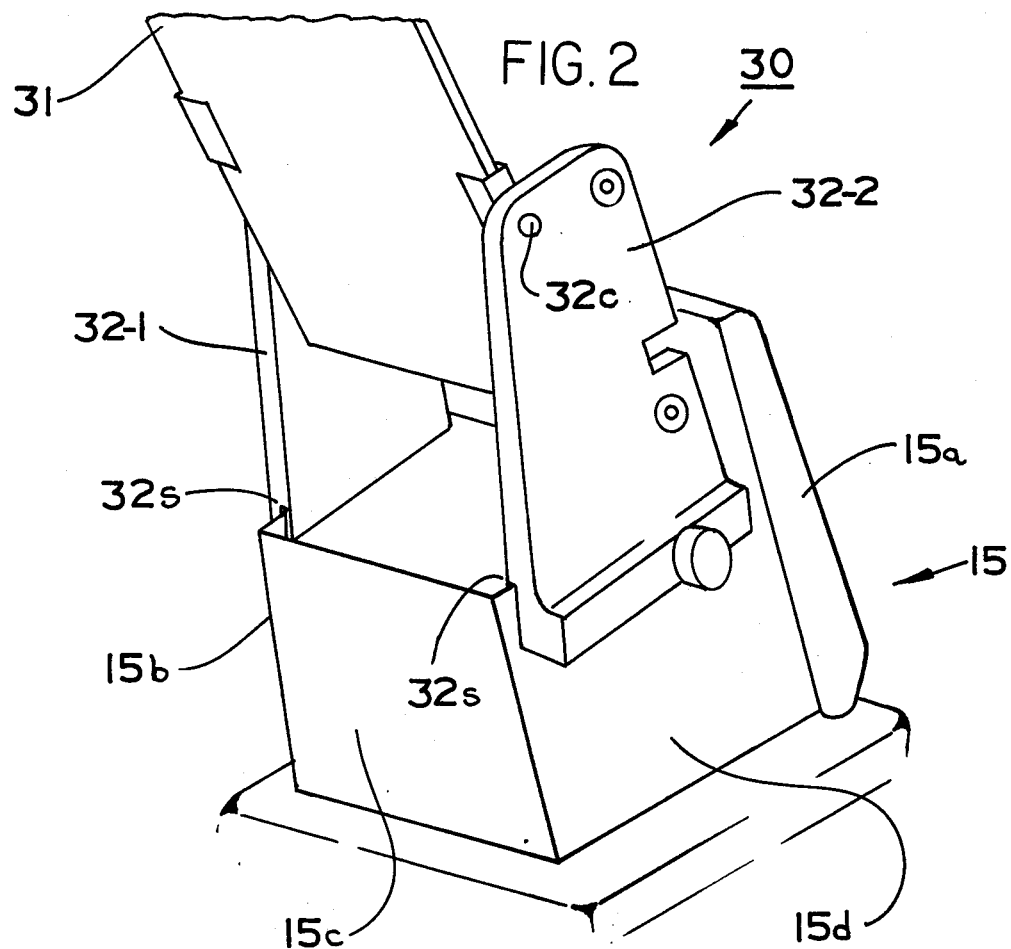
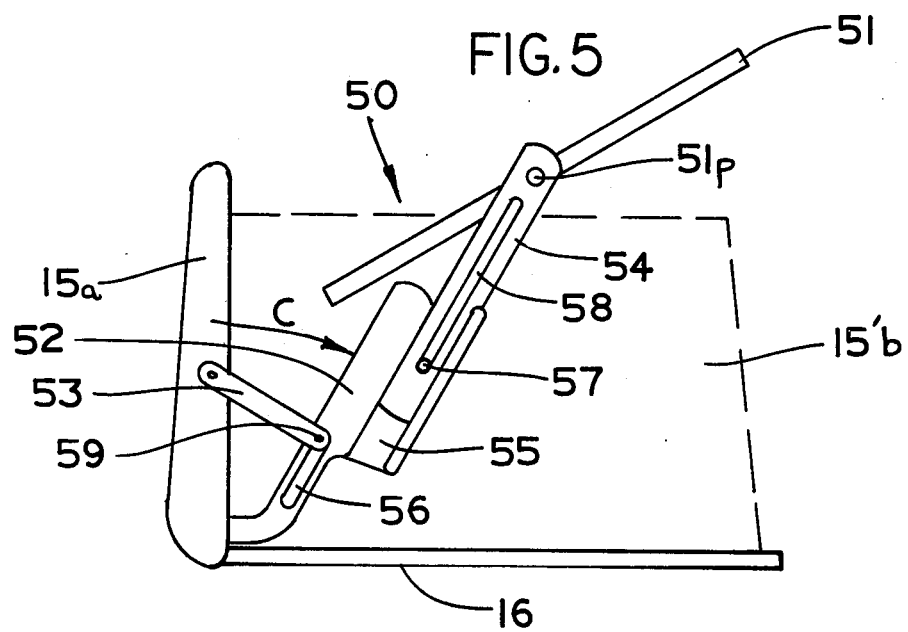

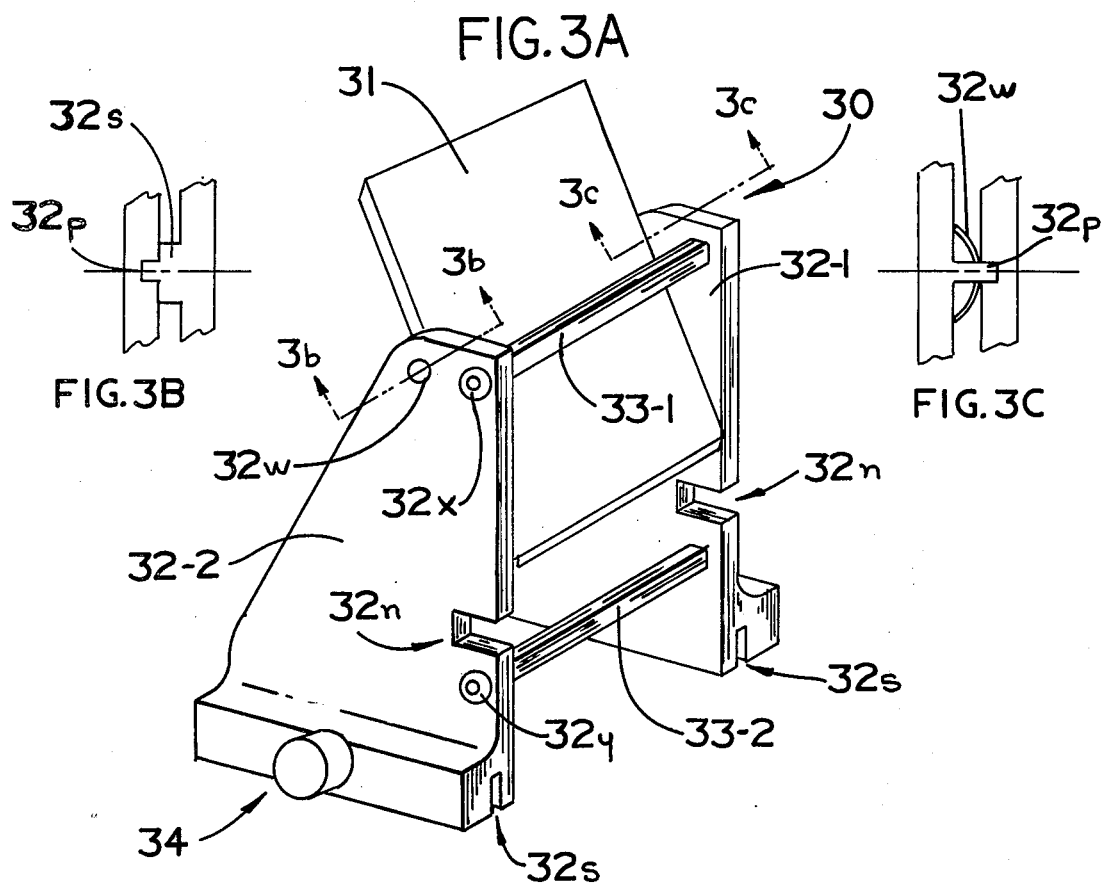
FIG. 3A
FIG. 3B
FIG. 3C
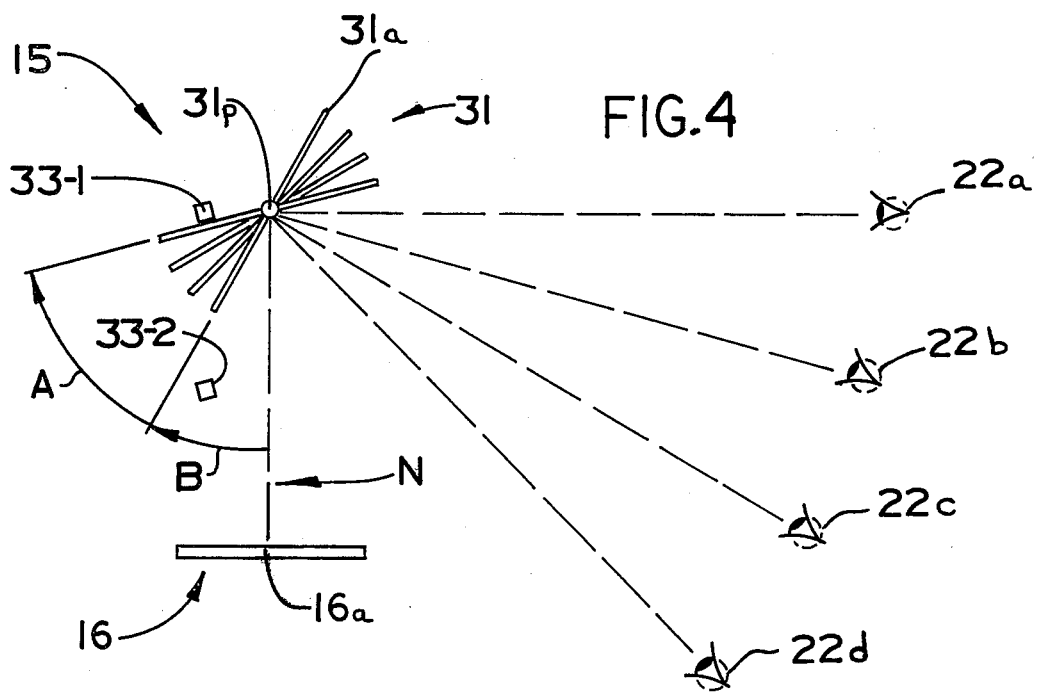
FIG. 4

CAMERA VIEWING ADAPTER

BACKGROUND OF THE INVENTION

This invention relates to camera viewers, and more particularly to viewers for reflex cameras.

In the typical reflex camera, an image to be photographed is composed on a ground glass viewing plate, which is either at the back of the camera or at the top. The back position is preferred for critical work because the viewing plate occupies the place of the film, but there is the disadvantage that the plate must be removed each time and the film substituted for it.

Consequently, in regular photography the viewing plate generally occupies a top position in a plane that is perpendicular to the film. The viewing plate is protected by a unit that can be opened to form a hood into which the photographer peers from above to compose the desired image.

In many types of photography, such as portraiture, it is desirable for the photographer to be able to see the scene directly, as well as in the viewer. He cannot do this when the viewing plate is at the top of the camera. Moreover, when the camera is used to take shots from a setting, for example, in a crowd where it is necessary for the photographer to hold the camera above his head, there can be difficulties in using both top and back position viewers.

Accordingly, it is an object of the invention to facilitate the taking of pictures, particularly with cameras that have a top viewer. A related object is to facilitate the taking of pictures in an inexpensive and expeditious fashion.

Another object of the invention is to achieve increased versatility in the use of reflex cameras with top viewers. A related object is to permit a top viewer camera to be used in situations where it is difficult, undesirable or impossible to have direct access to the viewer.

SUMMARY OF THE INVENTION

In accomplishing the foregoing and related objects, the invention provides a viewing adapter with an adjustable image reflector that is positionable with respect to the view finder of a camera.

In accordance with one aspect of the invention the reflector is offset with respect to the center of the view finder. This facilitates use of the adapter and limits the extent to which the reflector can interfere with other parts of the camera.

According to still another aspect of the invention the reflector is pivotally mounted near a corner position of the adapter, which likewise is held together by a cross bar at another corner of the adapter.

According to a further aspect of the invention, the adapter can be mounted on the shield for the viewer, when opened; or included in the shield.

DESCRIPTION OF THE DRAWINGS

Other aspects of the invention will become apparent after considering several illustrative embodiments, taken in conjunction with the drawings in which:

FIG. 2 is a perspective view of a viewing adapter in accordance with the invention positioned on the opened view finder shield of the camera of FIG. 1.

FIG. 3A is a perspective view from the front of the viewing adapter of FIG. 2;

FIGS. 3B and 3C are sectional views of the adapter of FIG. 3A;

FIG. 4 is a schematic drawing which illustrates the use of the adapter of FIG. 3A; and FIG. 5 is an alternative embodiment of the invention.

DETAILED DESCRIPTION

Figure 1:
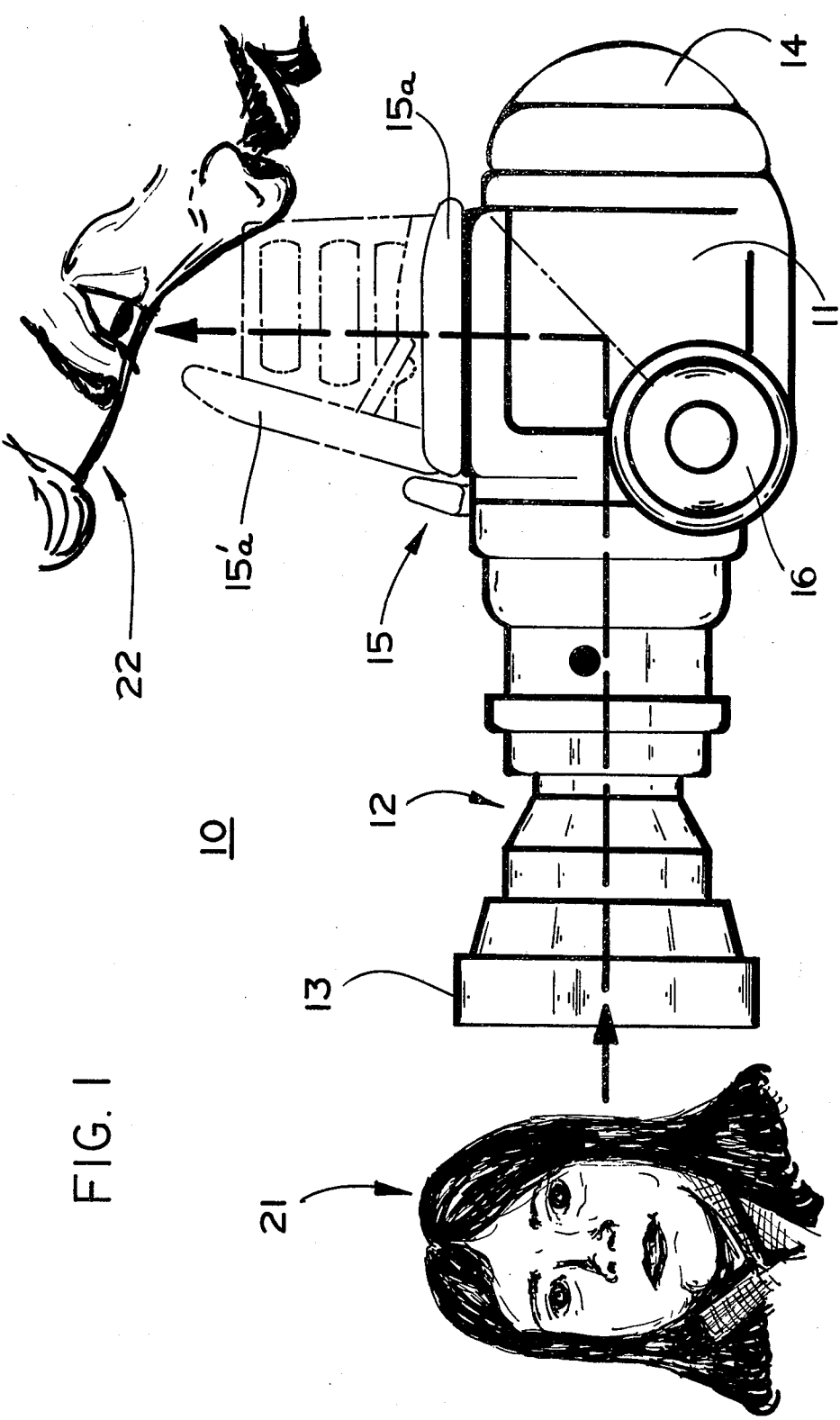
FIG. 1 is a side view of a representative reflex camera for use with the invention.

Turning to the drawings, a representative camera 10 is shown in FIG. 1. The camera 10 includes a box portion 11 with a conventional compound lens 12 and a lens hood 13 at one side of the box 11, designated as the "front," and a detachable film holder 14 at the opposite side of the box 11, designated as the "back." At the upper side spanning from the front to the back there is a shield housing 15 for a view finder plate of ground glass (not visible in FIG. 1). A representative camera is that known by the trademark and trade name "RB67 Professional" manufactured by the Mamiya Camera Co., Ltd. of Japan.

The view finder of the camera 10 becomes visible to the user when the shield 15 is opened by elevating the cover 15a to the phantom position $15a^1$ shown in FIG. 1. This permits spring biased collapsible panels, such as panel 15b, to unfold and form a protective hood for the view finder which is then visible from above the camera to an illustrative user 22.

The user operates the focussing knob 16 until the subject 21 is clearly focussed on the view finder plate. An internal reflector is then retracted and the film in the holder 14 is exposed.

It is apparent that the arrangement of FIG. 1 requires the user 22 to lean over the top of the camera 10 in order to properly focus the camera. This is inconvenient, for example, in portraiture, where it is advantageous for the user to be behind the camera and able to easily scan the scene directly and through the viewer.

Although a prism arrangement could be employed, it would be expensive and still require that the user keep his eye close to the camera and restrict his freedom of movement. In addition, other photographic situations arise where the camera must be held in a configuration where it is either inconvenient or impossible to look into the hood.

The invention remedies the prior art difficulties by an adapter of the kind designated by the reference numeral 30 in FIG. 2 and mounted in or with respect to the view finder housing 15 of FIG. 1.

The adapter 30, as shown in FIGS. 2 and 3A, is formed by an adjustable reflector, such as a mirror 31, which is pivotally mounted between side panels 32-1 and 32-2 that are respectively seated on viewer panels 15b and 15d by virtue of slots 32s in their base portions. The slots permit the removable attachment of the adapter to the camera. The pivot position of the mirror 31 is desirable at or near corners 32w of the adapter panels 32-1 and 32-2, which are at the upper rear portions of the adapter when it is positioned on the opened viewer hood. The panels 32-1 and 32-2 are held together by cross bars 33-1 and 33-2 by screws at or near corners 32x and 32y at the upper and lower frontal positions of the adapter when mounted on a camera.

Notches 32n in the adapter 15 permit it to be adjusted relative to the cover 15a. A locking screw 34 helps secure the adapter 15 to the hood. In addition, the mirror 31 has pivots 31p shown in FIGS. 3B and 3C. The edge of a mirror holder at one of the pivots 31p has a shoulder (FIG. 3B). The holder at the other pivot 31*p* (FIG. 3C) includes a spring washer 32*w* for proper tensioning of the mirror in the adapter 15.

The operation of an adapter 15 in accordance with the invention is illustrated in FIG. 4. The mirror 31 is shown with four different inclinations. Because of the offset of the pivot 31*p* with respect to the center 16*a* of the viewer 16, the mirror 31 can be adjusted for a wide variety of situations through a relatively small angle A.

Thus, with the mirror at a setting 31*a*, where the angle B formed with the normal N to the viewer 16 is slightly in excess of 45°, the viewer 16 can be used from a position 22*a* with the eye of the user well behind the camera. This permits the user to scan the photographic scene directly, as well as through the viewer 16. With the angle of tilt of the mirror 31 with respect to the normal N increased only slightly, by approximately 10°, the camera can be used from position 22*b* with the eye of the user below the adapter and approximately on the level of the viewer 16. Slight further increases in the tilt of the mirror 31 permit the camera to be used from positions 22*c* and 22*d*, with the eye of the user below the level of the camera.

In addition, as shown in FIG. 4, the position of the cross bar 33-1, that joins one side panel of the adapter to another, is such that there is no interference with the desired tilt of the mirror 31. The position of the second cross bar 33-2 also avoids any interference with the operation of the adapter.

It will be understood, however, that other positions may be chosen for the mirror 31, as well as for the connecting bars 33-1 and 33-2. Other forms of connector may be also employed.

An alternative embodiment of the invention is shown in FIG. 5, in which the adapter 50 is contained within the lid 15*a*. The adapter 50 is formed by a pair of arms 52, of which one arm is visible, that are pivotally mounted in the lid 15*a*. Each of the pivoted arms 52 has a channel 55 for a telescoping arm 54 to which a mirror 51 is pivotally connected. A link 53 for each pivoted arm has a pin 59 that rides in a slot 56 of the pivoted arm 52 and controls the angle C through which the frame of the adapter is pivoted within the hood, illustrated in phantom by the side panel 15*b'*.

A pin 57 in the channel 55 rides in a slot 58 and controls the extent to which the telescoping arm 54 can be withdrawn. The mirror 51 is pivoted to point 51*p* to permit appropriate adjustment with respect to the viewer 16 in accordance with the position of the user and the desired employment of the camera.

Other aspects of the invention will occur to those skilled in the art based on the foregoing disclosure and such modifications, including the substitution of equivalents for what has been shown and described, may be made without departing from the spirit and scope of the invention as set forth in the appended claims.

What is claimed is:

1. An adapter for a top viewer camera, comprising a support having spaced apart sides; a reflector pivotally attached to said sides to swivel and be usable through a range in excess of about ten degrees; and means on said adapter for removably attaching it to said camera.

2. Apparatus as defined in claim 1 wherein the reflector is offset with respect to the center of a view finder.

3. Apparatus as defined in claim 1 wherein the reflector is a mirror.

4. Apparatus as defined in claim 1 which is mountable on a view finder shield of the camera.

5. Apparatus as defined in claim 1 wherein said sides are panels between which said reflector is rotationally mounted.

6. Apparatus as defined in claim 5 wherein said reflector is rotationally mounted near an upper corner of said positioning panels.

7. Apparatus as defined in claim 6 wherein said positioning panels are held together by a cross bar at a corner opposite from that where said reflector is mounted.

8. Apparatus as defined in claim 5 wherein said reflector has a shoulder at its pivot position.

9. Apparatus as defined in claim 5 wherein said reflector has a spring washer at its pivot position.

10. Apparatus as defined in claim 1 wherein said reflector is pivotally attached to said sides to swivel and be usable through a range in excess of about 45°.

* * * * *